R. W. SCOTT.

METHOD OF KNITTING SELVAGED FABRICS.

APPLICATION FILED MAY 9, 1914.

Reissued June 16, 1914.

2 SHEETS—SHEET 1.

13,752.

Witnesses

M. G. Crozier,

A. M. Blades

Inventor.

Robert W. Scott by Robert C. Cline his attorney

R. W. SCOTT.

METHOD OF KNITTING SELVAGED FABRICS.

APPLICATION FILED MAY 9, 1914.

2 SHEETS—SHEET 2.

Reissued June 16, 1914.

13,752.

Witnesses
M. G. Crozier,
A. M. Blades.

Inventor
Robert W. Scott
by Robert C. Cenes
his attorney

UNITED STATES PATENT OFFICE.

ROBERT W. SCOTT, OF BOSTON, MASSACHUSETTS, ASSIGNOR TO SCOTT & WILLIAMS, INCORPORATED, OF CAMDEN, NEW JERSEY, A CORPORATION OF NEW JERSEY.

METHOD OF KNITTING SELVAGED FABRICS.

13,752. Specification of Reissued Letters Patent. Reissued June 16, 1914.

Original patent a continuation in part of application Serial No. 748,308, filed February 14, 1913. Original No. 1,094,347, dated April 21, 1914, Serial No. 796,524. Application for reissue filed May 9, 1914. Serial No. 837,571.

*To all whom it may concern:*

Be it known that I, ROBERT W. SCOTT, a citizen of the United States, and a resident of Boston, in the county of Suffolk and State of Massachusetts, have invented certain new and useful Improvements in Method of Knitting Selvaged Fabrics, of which the following is a specification.

An object of my invention is to institute knitting, for instance upon a series of like instruments, bare of previously formed fabric, in such a manner as to secure the certain starting of a knit wale at each of the instruments at the beginning of the fabric to be knit, and in such a manner as to secure the formation of a selvage or fast edge at the initial or primary end of the fabric to be knit, which fabric may be a flat or tubular article, blank or section. The structure at the beginning of the said fabric may be the same structure as that shown in Figure 2 of my Patent No. 1,045,621, dated November 26, 1912, or any structure of the genus of which the said figure shows one species.

My invention further comprises the method and steps of the method of manipulating a yarn or yarns with respect to instruments upon which loops may be formed, in order to secure the formation of structures of the genus illustrated in my said patent with improved certainty in the operation of the instruments and formation of the fabric.

Figure 1:
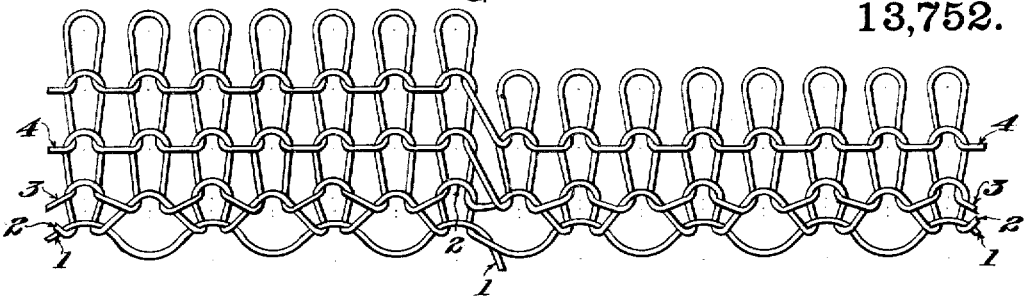
Figure 2:
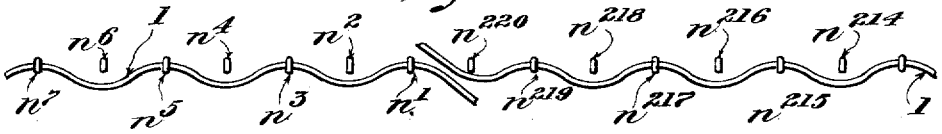
Figure 3:
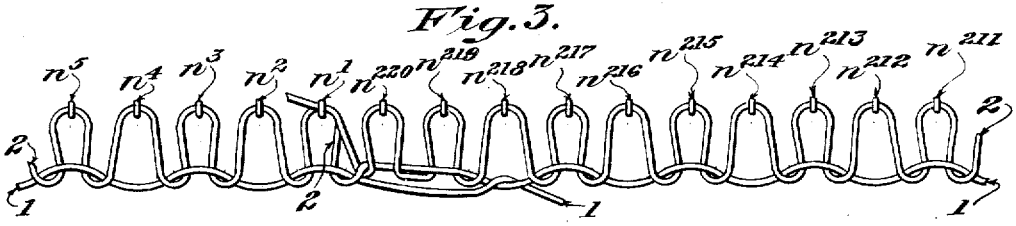
Figure 4:
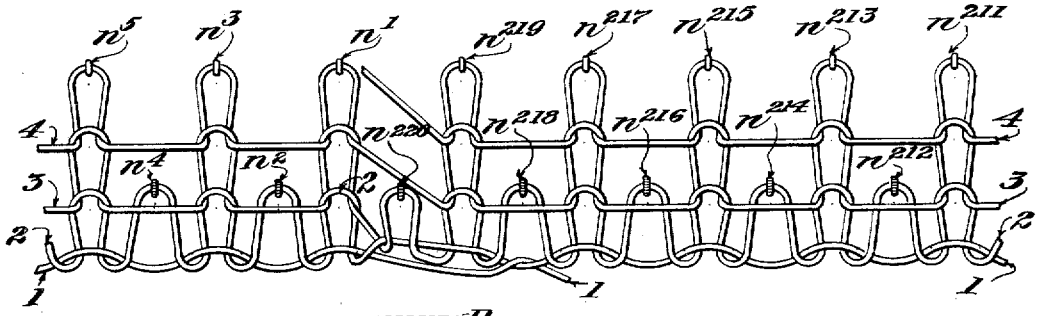
Figure 10:
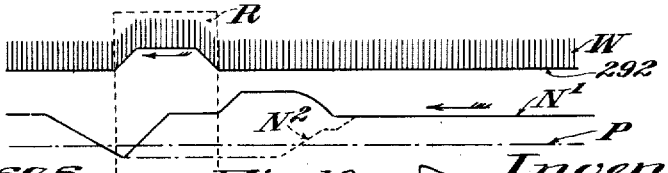
Figure 5:
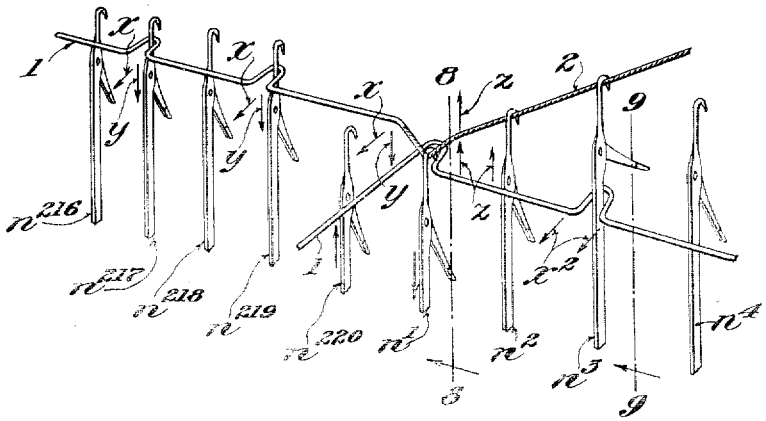
Figure 6:
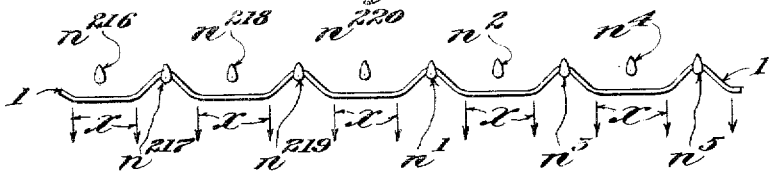
Figure 7:
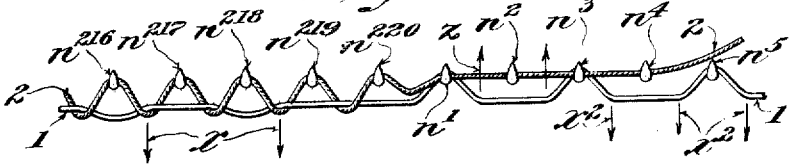
Figure 8:
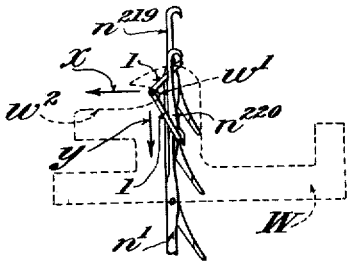
Figure 9:
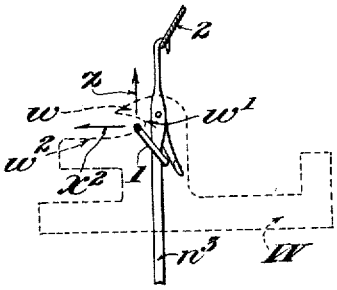

In the accompanying drawings,—Fig. 1 is an elevation showing in diagram the fabric of my said patent, the illustration comprising a fragment only of the first few courses; Fig. 2 is a diagram in plan showing the beginning and the end of the starting course; Fig. 3 is a view similar to Fig. 2 showing the beginning and end of the next course; Fig. 4 is a view illustrating one use in which my new method is of great advantage; Fig. 5 is a perspective showing the beginning and end of the starting course and beginning of a next course formed according to my method with respect to a series of latch needles movable in the direction of their length; Fig. 6 is a plan view of the instruments shown in Fig. 5, showing the yarn in the position given to it during the starting course; Fig. 7 is a similar view showing the position of the yarn with respect to the instruments during the next course; Fig. 8 is a diagram cross section with respect to the instruments shown in Fig. 5, illustrating the stresses upon the yarns at and to the left of the plane 8—8 of Fig. 5; Fig. 9 is a view similar to Fig. 8 taken at the plane 9—9; Fig. 10 is a diagram illustrating the movement of certain instruments employed when practicing my method upon a machine of a certain type.

In my said Patent No. 1,045,621, I described a method of forming a selvaged fabric comprising first feeding the knitting yarn to alternate needles of the set of needles upon which fabric was to be formed, then feeding the yarn to all of the needles during a second course, and thereafter feeding a third and other successive courses to all of the needles in a normal manner to complete the fabric.

My present invention has to do broadly with the same operations as disclosed in the said patent, but comprises in addition a certain order of movements given the yarn, and stresses and restraints laid upon the yarn with respect to its point of contact with the instruments for knitting, by virtue of which the yarn will be positioned to form the structure of said patent inevitably, when the usual knitting operations are also performed; and by reason of which the instruments are aided to begin normal knitting. My said method is susceptible of being carried out with respect to a series of instruments, one for each wale of the fabric to be produced, of any character at present known in the art; for instances only, upon instruments comprising latch needles or spring beard needles, which said instruments may either be fixed in their mounting or carrier, the yarn for the knitting operation proper being moved with respect to the hook end of the needles; or which instruments may be mounted to be longitudinally movable with respect to their carrier, the knitting operation being performed by movements of the instruments with respect to the yarn. The instruments employed may be arranged in an evenly-spaced series, the series occupying a complete circle; or the said instruments may comprise two lines or rows near each other at the ends of each of the rows; or my present method may be practiced in connection with a single row of instruments, not endless. In these respects my invention is adapted to and may be carried out upon knitting machines of types familiar in the prior art, types of such machines characterized by the arrangement of their instruments in each of the orders above indicated being familiar to knitting artisans. One of the objects to be secured is the certain starting when desired of a wale of loops at each of the instruments of a machine, or of a series of implements operated by hand at will, and it will be understood that my method is independent of any particular machine or set of implements, so long as the instruments employed in its practice are capable of holding the loops of which the forming fabric is composed during the performance of the operations essential to its practice.

Referring now to Figs. 2 and 3, I may begin the operation by applying yarn for a starting course 1 to alternate instruments shown as those bearing the odd numbers in the series $n^1$ to $n^{220}$ and indicated in Fig. 2 at $n^1$, $n^3$, $n^5$ to $n^{219}$, it being assumed for the present that the instruments are hooked needles arranged in a circle, containing 220 needles, upon which knitting is to proceed successively from right to left of the segment illustrated conventionally as a straight line of needles.

When I mention applying yarn for a starting course, it is not to be understood that said yarn is necessarily the first yarn applied to the needles for the formation of the ensuing section of fabric. I may, for instance, lay one or several runs of yarn upon the needles before beginning the operations described for the starting course, in which case the said yarns form no permanent part of the fabric, not being bound into the knit structure; or I may cause the yarn to be arranged upon the instruments in the path described for the starting course 1 during several passages of the feed point with respect to all of the needles, in which case, if the needles are not being moved as when knitting the said starting course will be doubled or multiplied, but otherwise be as shown. In case, however, of such multiple or double feeding, if the needles taking the yarn up to this time are operated, as by normally advancing and retracting them at each passage of the feed point, only the last-taken yarn will be retained in the hooks of the needles taking it, that is to say the odd-numbered needles as instanced, to constitute the course referred to as starting course 1. I prefer, however, to lay the starting-course upon all of the needles but once, with such overlapping as may be necessary to insure missing none of them.

While I have instanced alternate instruments to receive the yarn of the starting course 1, it will be apparent that other recurrent instruments or groups of instruments, such as every third or fourth member or pair of the series may be selected, and that I may, if desirable, cause all of the instruments to receive yarn, and thereafter cast off the yarn from some of them, so as to secure the same result of a course of yarn applied to recurrent instruments only. The yarn so applied to the said recurrent instruments will now be caused at the location of the intervening instruments to tend to pass toward the backs of said intervening instruments.

In the case of independently movable latch needles, as illustrated in Fig. 5, yarn of the course 1 may, for instance, be applied by causing it to be taken in the hooks of the needles $n^1$, $n^3$, etc., to $n^{219}$, as illustrated in said figure, by moving the needles with respect to a guide or source of yarn, not shown, so as to cause the hooks of the odd numbered needles to receive the yarn. In order to cause the yarn to pass toward the backs of the intervening needles, stresses are applied to the yarn after or during the action of the needles to take it, and particularly stresses in the direction indicated by the arrows $x$, Figs. 5 and 6, at the points indicated by said arrows and restraint against movement with the needles in either direction is caused to be applied to the said yarn at the points indicated by the arrows $y$, for the purposes respectively of moving the yarn through a limited distance in the direction of said arrows $x$ when it is free to move, of holding the yarn firmly against the faces of the needles after said movement shall have been made, and for preventing any considerable movement of the said yarn in the directions like or opposite to those indicated by the said arrows $y$. In the case of the stresses indicated by the arrows $x$ movement is implied in the sense that the yarn shall be caused to move to the position indicated in Figs. 5 and 6, before the cessation of the strain upon it, whenever it is free so to move, and in the case of the restraint at the points $y$, movement is not necessarily implied, mere resistance against displacement in either direction being sufficient when the operation is carried out by instruments or needles moving in the direction of their own length. But it will be understood that my invention comprises as well equivalent operations involving the bodily movement of the yarn with respect to or upon stationary needles or instruments, and in that case the restraint upon the yarn in either direction in the plane of or at the points represented by the arrows $y$ may consist of confinement of the yarn at those points to movement in a certain path with respect to the instrument $n$, so far as movement in or parellel to the plane of the instruments is concerned. In the particular case of independently movable instruments, such as those of Fig. 5, I may therefore first feed the yarn as explained above to alternate needles of the odd-numbered series, and then cause it to move, when free to move, through limited distances in the directions and at the points represented by the arrows $x$, and prevent it from moving at points between the needles through any substantial distance with respect to the needles in directions like or opposite to the arrows $y$.

To freely permit the movements $x$, I may cause the even-numbered needles $n^2$ to $n^{220}$ to approach the region at which the stress resulting in said yarn movements is given upon a path too low to encounter the yarn between two adjacent needles of the odd-numbered series. Thus, in Fig. 5, needle $n^{220}$ is shown in such a position, with respect to the needles $n^1$ and $n^{219}$ flanking it. But it will be clear that, if desired, the even-numbered needles, so long as the yarn has not entered their hooks, might be retracted after those of the odd-numbered series have taken yarn, to bring their heads out of the path of the yarn extending between the odd-numbered needles, during maintenance of the stress in the direction of the arrows $x$, all with the same effect of thrusting the run of yarn behind the even-numbered instruments and holding it against the faces of the odd-numbered instruments. The instruments of the even-numbered series $n^2$, $n^4$, etc., to $n^{220}$ are now caused to move upward in succession through the plane defined by the position of the yarn upon the remaining instruments and in front of the yarn.

In the case of a circle of instruments, or of two flat rows of instruments near each other at their respective ends, and in case the knitting of a tubular fabric is to proceed in spiral courses always running in the same direction, I complete a circuit of the instruments with the starting course 1 taken by the odd-numbered instruments, the yarn of said course being moved and held in the manner indicated.

In order to produce the arrangement of the yarn shown in Fig. 2 and Fig. 1, upon a circle of needles, I so select the needles to receive the yarn, in relation to those which do not receive it, as to cause the end of the circle of the first course to be reached without altering the relation of the needles which receive and those which do not receive the yarn. This happens when the recurrent needles taking the yarn are of a number evenly divisible into the whole number of needles. If any other number of needles should be provided in the circle, or any other number should be selected to receive the yarn of the starting course, at some point in the circle either adjacent needles would take the yarn, or adjacent needles would miss the yarn, in case of the one-and-one alternation specifically shown in Figs. 1 and 2. In any case the certain starting of all of the knit wales would be endangered, at the point where the first course begins and ends, by the production of an irregular engagement or relation of the yarn to the needles at that point, resulting in two or more adjacent needles casting off either the first or the second course in common, thus preventing the arrangement throughout the circle of the course following the starting course alternately or recurrently in groups of stitches respectively drawn to opposite sides of the starting course. A preferable selection of numbers is that shown in which the whole circle of needles is an even number, and the number selected to receive the yarn at starting is half that number.

Instruments of many different kinds for placing yarn under lateral stress and for restraining yarns from following vertical impulses are well known in the prior art, for instance independently movable web holders such as those shown at W having hooks $w$ and throats $w'$, the position of the web holders in respect to the needles, when they are exerting stress and restraint upon the yarn, being indicated in Figs. 8 and 9. I may employ such instruments in practising my method, causing their movements, in the case of machine operation, to be effective in a timely manner to cause the stress and restraint upon the yarn to occur with respect to the knitting or loop-forming movements of the remaining instruments at the times necessary to carry out the order of procedure comprised in my present invention.

I have indicated by arrows $z$, $z$, the withdrawal of any restraint upon the yarn in the direction of said arrows at the points indicated. This withdrawal of restraint may be secured by causing the recession of the hooks $w$ of web-holders W at this point in the operation; for instance in the case of a machine the web-holder hooks $w$ may be withdrawn after the needles have accomplished a preliminary descent and have taken yarn, and may then be reinserted shortly after the needles have reached the point of their maximum withdrawal into their carriers. For instance, Fig. 10 shows in diagram at 292 a path of movement for web-holders W in conjunction with paths of movement (arbitrarily shown in the same plane) $N^1$ and $N^2$ for the heads or hook ends of the odd-numbered and even-numbered needles respectively, the line P indicating the knocking-over plane of the machine devices. The area R represents a region within which the webholders W may be withdrawn and in which area the restraint of the yarn in the direction $y$ is not necessary, corresponding to the position of the said arrows $z$ in Fig. 5. I do not herein claim mechanism for performing the said operations, such mechanism being described and claimed in my application Serial No. 766,401, filed May 8, 1913, which application is a continuation of my application, Serial No. 766,070, filed February 3, 1913.

It will be understood that the withdrawal of restraint in the direction indicated by the arrows $z$ is permissive only, and such withdrawal forms no part of the necessary operations. I may, however, take advantage of the area in the field of operations represented by the location of the area R when I use the independently movable webholders W for giving a withdrawal movement to the said instruments, in order to permit the new yarn being taken by the needles to come to rest at the knocking-over plane P defined by the surfaces $w^2$ of said webholders, for instance by mechanism such as that of my said application.

The stresses upon the yarn in the directions $x$ may be maintained at all points in the series of needles during the laying of the starting course 1 in the manner indicated, but I do not regard this as essential, so long as the stresses are maintained in this direction at that point at which the still active instruments of the intervening (even-numbered) series are passing upwardly through the plane defined by the points of contact with the yarn of the remaining instruments. This will be made plain by reference to Figs. 2, 6 and 10, it being borne in mind that one purpose of the operation so far is to secure the threading of the yarn of the starting course alternately in front of and behind the hooked instruments upon which knitting is to be started, and the sure retention of the yarn in the hooks of the instruments which have taken it. The said point in the operation in the described instance is that indicated in Fig. 5 at the region of the needle $n^{220}$, which has begun to move upward as indicated in said figure, and will in due course reach the same position as the needle $n^{218}$. After the needles shall have reached this position they may remain at rest during the remainder of the course 1. This point upon Fig. 10 is at and near the second or following intersection of the plane P and the paths $N^1$, $N^2$.

In case my method is practised with the aid of a machine having independently movable webholders, the maintenance of stress in the direction of the arrows $x$ is consistent with the usual function of the said webholders at a later time in the operation, in a manner and for a purpose well known in the art, and I may maintain such instruments for instance as the webholders W, in the position shown in Fig. 8 from a point to the right of the needle $n^{220}$ in Fig. 5 throughout the laying of the first course, and until the needles have been again given a movement of projection, for instance to permit them to rise to clear their latches prior to taking yarn for the second course. The inward position of the webholders during this movement of projection will not alter the stress in the direction of the arrows $x$, and such movement in connection with the needles rising for this purpose is an old function of such webholders, familiar to those skilled in this art, having for its purpose the retention of the last course of previously knit fabric on the needles at the level defined by the webholders during the upward or advancing movement of the needles.

The operation so far has produced the results shown in Fig. 2 and Fig. 6. To complete the first courses of the selvage structure shown in Fig. 1 and in my said Patent No. 1,045,621, I now feed the next course 2 to all of the needles; or in the case of other species of said structure, to the needles holding the starting course and to some of the other needles. The purpose of this operation is to secure the interloopment of said course 2 recurrently back of and in front of the yarn of course 1 when said course 1 is cast off in the manner illustrated in Fig. 3 and at the left hand side of Fig. 7. When the instruments involved are latch needles, I provide that those parts of the course 1 which lie in front of or on the hook side of the needles shall certainly pass outside of the closing latches when the needles descend with the new yarn in their hooks. Otherwise the said loop of course 1 may pass over the end of the open latch and enter the hook of the needle together with the yarn of course 2 and delay the initiation of knitting; or the loop of course 1 may extend so far in front of the descending needle as to encounter neither the open end of the latch nor the hook, and thus pass freely over the head of the needle, thus preventing a beginning of knitting. In the case of an independently movable needle, which having risen to take yarn is about to be withdrawn into its carrier, I find it therefore important to maintain the yarn of the starting course under stress against the face of the needle during the initial part of its retracting movement, or until the yarn has landed safely under the depending open end of the latch in the case of a latch needle, or over the closed spring beard in the case of a spring beard needle. I therefore maintain the stress in the direction of the arrows $x$, in the direction and at the location of the arrows $x^2$, shown in Figs. 5 and 9, as at the location of the needle $n^3$. The effect of this stress, as illustrated in Fig. 9, is to hold the bight or loop of course 1 firmly against the front face of the descending needle, which the loop may not follow by reason of the restraint from moving in the direction $y$. This may occur either before or during the engagement of the new yarn of course 2 with the hook of the needle. In practising my method by a latch needle machine, for instance the machine of my said application No. 766,401, I may permit the preliminary descent of the needle to land its latch over the bight or loop of the first course before the hook of the needle encounters the new yarn. When practising my method in connection with spring needles, I apply the new yarn under the hooks or beards of the needles before this preliminary descent (or equivalent lifting movement of the old loop) during which movement the beards will be pressed, permitting the final part of the relative movement between the yarn-loop and needle-hook to cause the loop to be landed over the closed beard. The maintenance of stress at this stage of the operation is equally important when fabric is being formed by manipulating the yarn on a fixed row of needles. The relative movement to be made between the needle and the yarn loop upon it at this time in any case is one of approach between the loop and the hook end of the needle, the function to be performed being the adjustment of the point of contact of the yarn loop upon the needle to a position from which further movement in the same direction of either needle or yarn will free or cast off the old loop with certainty. This position of the point of contact upon a latch needle is that above stated at which the loop rests snugly against the shank of the needle, under and beneath the open or partly open latch. The similar position upon a spring needle is that at which the loop is landed over and rests snugly upon the outer face of the needle-beard. Stress upon the loop in the direction $x^2$ at this time may thus perform in the case of the initial course the function performed during normal knitting by the tension of the previously formed fabric, of which the initial or first few courses of a newly begun fabric can obtain no benefit. Stress or restraint from movement in the direction $y$ alone will be inoperative with any certainty, failing of any tendency to hold the loop against the needle. After this point the maintenance of stress in the direction of the arrows $x^2$ is not essential, and I may utilize this fact when carrying out the operation by a machine employing web-holders by now withdrawing the web-holders at the relative location of the area R of Fig. 10, for the purpose explained above. With respect to course 2 and the later courses, stresses in the direction of and at the location of the arrows $x$ and $x^2$ are not detrimental to the purposes for which webholders are commonly employed in independent needle knitting machines, the effect of these stresses being merely to extend the relative area of active stress upon the last course knit, and by this means to increase the relative number of loops held from following the movement of the needles during normal knitting.

While the advantage of my method will be obvious, I have shown in Fig. 4 the particular application thereof to the manufacture of a fabric in which it is not only desirable but requisite that knitting should be started at every wale with certainty. In this case the selvage structure of my said Patent No. 1,045,621, comprising courses 1 and 2 is employed at the beginning of a welt of plain fabric, one end of which is desired to be attached at a later time in the operation to its other end and to another continuous extent of fabric, for instance forming the leg of a stocking. For this purpose the loops of the second or a later course taken at the even-numbered needles are withheld during the knitting of fabric for the welt, and not cast off until sufficient fabric has been knit for the welt. The failure of either the odd or the even-numbered series of needles to initiate knitting in any wale obviously will prevent any utility in the resulting article.

By the practice of the method above described for laying the starting and a following course, I am enabled to secure very efficient operation of the machine devices usually employed even when knitting with refractory yarns at a high speed.

By the application of the stresses, and placing the yarn under restraint in the manner indicated, I thus cause the operation of the familiar knitting instruments noticed to be begun with certainty under conditions regarded as difficult by those skilled in knitting upon such instruments.

I do not herein claim the fabric structure described in connection with Fig. 4 which forms a part of the subject matter of my application Serial No. 748,308, (Letters Patent No. 1,079,267, dated November 18, 1913), filed February 14, 1913, of which application the present application is a continuation in part.

What I claim is:—

1. The art of knitting fabric on a series of hooked instruments comprising causing a starting course of yarn to lie against the hooked faces of certain of said instruments, placing said yarn under stress toward said faces, and then causing relative movement between said yarn and other of said instruments during maintenance of said stress whereby the said yarn rests on the faces of said certain instruments and passes behind said other instruments.

2. The art of knitting fabric on a series of hooked instruments comprising the steps, causing a run of yarn to lie against the hooked faces of some of said instruments, maintaining said yarn under stress in a direction toward said faces, then causing relative movement between said yarn and other of said instruments during maintenance of said stress whereby said yarn passes behind said other instruments; then laying a next run of yarn against the instruments, and then casting off the first-mentioned run on to the next run of yarn, whereby said next run is drawn into loops passing on either side of the first-mentioned run of yarn; and then knitting in the usual manner at said instruments.

3. The art of knitting fabric on a series of hooked instruments comprising the steps, laying yarn in the hooks of some of the instruments, maintaining said yarn under stress in a direction toward said hooks tending to cause the yarn to pass toward the back of the intervening instruments, arranging the point of contact of the yarn with the instruments upon which it is held during the maintenance of said stress in a position to secure casting off upon relative movement between the instruments and the yarn; laying another run of yarn against the instruments, and then casting off the first-mentioned run, whereby said other run of yarn is drawn into loops passing recurrently in front of and behind the first mentioned run of yarn; and thereafter knitting in a normal manner at said instruments.

4. The art of knitting fabric on a series of latch needles comprising the formation of a starting run or course of yarn into loops holding said loops under stress against the faces of certain of said needles only, forming a next course or run of yarn having loops at said certain and at other instruments, and casting off said starting run while retaining said next course upon the instruments, the operation including positioning the loops of said starting run between the faces of the needles and the points of their open latches while maintaining said stress.

5. The method of knitting upon previously bare instruments fabric having an initial selvage, which consists in supplying a starting run of yarn to the faces of recurring members only of a series of such instruments while said instruments are in a position of advance to receive said yarn, then placing said run of yarn under stress tending to cause it to pass toward the backs of said instruments during the movement of some of the instruments through the plane defined by the yarn on said recurring instruments, supplying a next run of yarn to said recurring and to other of said instruments, then casing off the starting run of yarn, and thereafter knitting fabric in the usual manner upon all of the instruments so far employed.

6. The art of knitting fabric on a series of hooked instruments comprising the steps, laying yarn in the hooks of some of said instruments, maintaining said yarn under stress in a direction toward said hooks during relative movement between said yarn and other of said instruments to cause said yarn to pass behind said other instruments; adjusting by relative movement the points of contact of said yarn and said first-mentioned instruments to a position to secure free casting off upon further relative movement between said yarn and said instruments, during maintenance of said stress; then laying another run of yarn against the instruments, and then casting off the first-mentioned run, whereby said other run of yarn is drawn into loops passing on either side of the first-mentioned run of yarn; and then knitting normally at said instruments.

7. The art of knitting fabric consisting of feeding an initial run of yarn to recurring needles only of a series of needles having hooks, then placing said yarn under stress in a direction toward said hooks, then causing relative movement between said yarn and the intervening needles during maintenance of said stress, whereby the said yarn passes behind said intervening needles, then laying a second run of yarn in the hooks of each of said recurring needles and of other needles of the series, then casting off the initial run of yarn and retaining the second run of yarn upon each of the needles to draw said second run into loops passing at each side of the initial run of yarn, and thereafter knitting successive courses of fabric having wales initiated at each of said loops.

8. The method of knitting upon previously bare instruments fabric having an initial selvage which consists in supplying an initial run of yarn to the faces of recurring members only of a series of such instruments while said instruments are in a position of advance to receive said yarn, maintaining said run of yarn under stress tending to cause it to pass toward the backs of said instruments during the movement of all of the instruments to a position to receive the yarn and during movement of the instruments to a position from which further movement will cast off the loops upon said recurring instruments, supplying a second run of yarn to said instruments, casting off the initial run of yarn, and thereafter knitting a normal and following courses of fabric beginning at the loops of said second run of yarn.

9. The art of knitting fabric on a series of hooked instruments comprising the steps, first applying yarn to recurrent instruments for a starting course, then applying stress to said yarn to hold it against the faces of said instruments, and then causing relative movement, between the instruments to which yarn has not been applied intervening between those which have taken it, and the yarn, during the maintenance of said stress; then causing relative movement between the yarn and said instruments, to cause the yarn on and the hooked end of the instruments to be separated; then causing relative movement between said yarn and said instruments in the opposite direction, during the maintenance of said stress; thereafter applying yarn for a next course of the hooks of all of said instruments; then causing the relative movement of the yarn upon said instruments toward and over the hooked end thereof to cast off the first course; and thereafter knitting in the usual manner at said instruments.

10. The art of knitting fabrics having a fast edge upon a series of previously bare latch needles comprising first laying a first run or course of yarn into the hooks of recurrent needles only, then placing the yarn under stress in a direction substantially at right angles to the series of needles, then causing relative movement between the runs of yarn joining said recurrent needles and needles intervening between said recurrent needles, during maintenance of said stress, whereby the yarn is passed behind the intervening and held upon the faces of the recurrent instruments; then causing a relative movement of separation between the hooks of the needles and the yarn upon them, to clear the latches of said recurrent needles through the loops, followed by a relative movement of approach during the continuance of stress upon the yarn to land the open latches over the loops, and thereafter laying a second run of yarn in the hooks of all needles, then casting off the first course, and thereafter knitting successive courses at all of the instruments.

11. The art of knitting tubular seamless fabrics on an endless series of hooked instruments comprising the formation of a selvage by causing a yarn to lie in succession in one direction against the hooked faces of said instruments, placing the said yarn under stress toward said faces and causing relative movement between the said yarn and other of said instruments, whereby said yarn passes behind the backs of said other instruments; then laying a next run of said yarn in the same direction successively in the hooks of certain instruments and said other instruments and thereafter casting off the first-mentioned run of yarn while retaining said next run of yarn in the hooks of each of said instruments; and thereafter knitting circular courses upon said instruments.

12. The art of knitting tubular fabric on a circle of needles comprising causing a starting course of yarn to lie in succession in one direction in engagement with recurrent needles only among the others whose number is evenly divisible into the whole number of needles, beginning at a certain needle, and encircling all the needles, then causing a next course to be engaged with needles including needles intervening between said recurrent needles, beginning at a needle next to said certain needle, and thereafter casting off said starting course and then knitting successively in the same direction a course containing stitches at each of the needles previously engaged by the yarn, and a plurality of like following courses.

13. The art of knitting tubular fabric on a circle of needles comprising causing a starting course of yarn to lie in succession in one direction in engagement with alternate needles only among the others whose number is evenly divisible into the whole number of needles beginning at a certain needle, and encircling all the needles, then causing a next course to be engaged with all the needles, beginning at the needle next beyond said certain needle, and thereafter casting off said starting course, and then knitting successively in the same direction a course containing stitches at each of the needles, and a plurality of like following courses.

14. The art of knitting tubular fabric on a circle of needles comprising causing a starting course of yarn to lie completely around the circle of needles in engagement with certain only of said needles, placing said yarn under stress toward the faces of the needles during relative movement between said yarn and other of said needles, whereby the yarn passes behind said other needles, forming a next complete circular course of said yarn comprising loops drawn recurrently to each side of said starting course, and thereafter knitting of said yarn tubular fabric consisting of like courses following a course having stitches drawn through each of said loops.

15. The art of knitting tubular fabric having a fast edge or selvage upon a circle of needles comprising forming of the knitting yarn a starting course extending completely around the circle of needles and engaging recurrent needles only, beginning with a certain needle, the operation including placing said yarn under stress toward the faces of said recurrent needles and causing relative movement between the yarn and said other needles, whereby the yarn passes behind said other needles, then forming a next complete circular course of said yarn beginning at said certain needle and comprising loops drawn recurrently to each side of said starting course, and thereafter knitting of said yarn tubular fabric consisting of like courses following a course having stitches drawn through each of said loops.

In testimony whereof, I have signed my name to this specification in the presence of two subscribing witnesses.

ROBERT W. SCOTT.

Witnesses:

M. G. Crozier,

Mary F. Griffin.

Corrections in Reissue Letters Patent No. 13,752.

It is hereby certified that in Reissue Letters Patent No. 13,752, reissued June 16, 1914, upon the application of Robert W. Scott, of Boston, Massachusetts, for an improvement in "Method of Knitting Selvaged Fabrics," errors appear in the printed specification requiring correction as follows: Page 6, line 69, for the word "casing" read *casting;* page 7, line 22, for the word "of" read *to;* same page, line 51, before the word "needles" insert the article *the;* and that the said Letters Patent should be read with these corrections therein that the same may conform to the record of the case in the Patent Office.

Signed and sealed this 7th day of July, A. D., 1914.

[SEAL.]

R. F. WHITEHEAD,

*Acting Commissioner of Patents.*